(12) United States Patent
Miyashita et al.

(10) Patent No.: US 10,050,481 B2
(45) Date of Patent: Aug. 14, 2018

(54) PERMANENT MAGNET TYPE MOTOR AND METHOD FOR MANUFACTURING PERMANENT MAGNET TYPE MOTOR

(71) Applicant: SANYO DENKI CO., LTD., Tokyo (JP)

(72) Inventors: Toshihito Miyashita, Tokyo (JP); Manabu Horiuchi, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 703 days.

(21) Appl. No.: 13/947,661

(22) Filed: Jul. 22, 2013

(65) Prior Publication Data
US 2014/0042856 A1 Feb. 13, 2014

(30) Foreign Application Priority Data
Aug. 7, 2012 (JP) .................. 2012-175005

(51) Int. Cl.
*H02K 15/03* (2006.01)
*H02K 1/27* (2006.01)
*H02K 15/12* (2006.01)

(52) U.S. Cl.
CPC ............. *H02K 1/276* (2013.01); *H02K 15/03* (2013.01); *H02K 15/12* (2013.01)

(58) Field of Classification Search
CPC ........ H02K 1/276; H02K 1/2766; H02K 1/28; H02K 1/30; H02K 15/03; H02K 15/12; H02K 2201/06
USPC ........ 310/156.53, 156.21, 216.015–216.017, 310/216.048, 216.109, 216.08
See application file for complete search history.

(56) References Cited

U.S. PATENT DOCUMENTS 5,936,323 A * 8/1999 Shibukawa ............ H02K 1/276
310/152
5,973,426 A * 10/1999 Fujinaka .................. H02K 1/14
310/268

(Continued)

FOREIGN PATENT DOCUMENTS

CN 101594014 A 2/2009
DE 102010041599 A1 * 3/2012 ............. G01M 1/36

(Continued)

OTHER PUBLICATIONS

Kimura et al., Machine Translation of JP2003134705, May 2003.*

(Continued)

*Primary Examiner* — Quyen Leung
*Assistant Examiner* — Eric Johnson
(74) *Attorney, Agent, or Firm* — Polsinelli PC

(57) ABSTRACT

Provided is a method for manufacturing a permanent magnet type motor in which a permanent magnet is incorporated into a rotor cores stack, the method including a process of forming the rotor core stack, by combining a plurality of core sheets having a magnet insertion hole with a core sheet not having the magnet insertion hole, and disposing the core sheet not having the magnet insertion hole in one end of a stacking direction; a process of injecting a low-viscosity adhesive into the magnet insertion hole in which one end is blocked by the core sheets; and a process of bonding and fixing the permanent magnet by inserting the permanent magnet into the magnet insertion hole into which the low-viscosity adhesive is injected.

5 Claims, 12 Drawing Sheets

(56) References Cited

U.S. PATENT DOCUMENTS

| | | | |
|---|---|---|---|
| 6,331,746 B1 * | 12/2001 | Fujitani | H01F 7/145 310/14 |
| 8,058,767 B2 | 11/2011 | Haruno et al. | |
| 2003/0230948 A1 * | 12/2003 | Murakami | H02K 1/276 310/156.53 |
| 2005/0140235 A1 * | 6/2005 | Yamagishi | H02K 1/276 310/156.53 |
| 2008/0218022 A1 * | 9/2008 | Lee | H02K 29/03 310/156.53 |
| 2008/0224558 A1 * | 9/2008 | Ionel | H02K 1/2766 310/156.57 |
| 2008/0238219 A1 | 10/2008 | Hoshino et al. | |
| 2008/0289226 A1 * | 11/2008 | Yamagishi | E01H 5/04 37/246 |
| 2009/0045689 A1 | 2/2009 | Haruno et al. | |
| 2009/0224620 A1 * | 9/2009 | Okubo | H02K 1/278 310/156.25 |
| 2009/0278417 A1 * | 11/2009 | Mizuno | H02K 1/276 310/156.53 |
| 2013/0257189 A1 * | 10/2013 | Blum | G01M 1/36 310/51 |

FOREIGN PATENT DOCUMENTS

| | | | |
|---|---|---|---|
| JP | 2002058184 A | | 2/2002 |
| JP | 2003134705 A | * | 5/2003 |
| JP | 2003199303 A | | 7/2003 |
| JP | 2005057865 A | | 3/2005 |
| JP | 2007049803 A | * | 2/2007 |
| JP | 2007244029 A | | 9/2007 |
| JP | 2008022601 A | | 1/2008 |
| JP | 2008245405 A | | 10/2008 |
| JP | 2008306874 A | | 12/2008 |
| JP | 2009240109 A | | 10/2009 |
| JP | 4856990 B2 | | 1/2012 |
| JP | 2012115016 A | * | 6/2012 |
| KR | 20-1997-0047535 | | 7/1997 |

OTHER PUBLICATIONS

Yamagishi, machine translation of jp2012115016, Jun. 2012.*
Ogami, Machine Translation of JP2007049803, Feb. 2007.*
JP OA dated Dec. 1, 2015 for corresponding JP Patent Application No. 2012-175005.
Office Action dated Sep. 5, 2016 from Chinese Patent Application 201310342099.9, pp. 1-9.
Office Action dated Jun. 26, 2017 issued in corresponding Korean Application No. 10-2013-0092669, 5 Pages.

* cited by examiner

500

PERMANENT MAGNET TYPE MOTOR AND METHOD FOR MANUFACTURING PERMANENT MAGNET TYPE MOTOR

CROSS-REFERENCE TO RELATED APPLICATION

This application claims priority to Japanese Application No. 2012-175005, filed Aug. 7, 2012, the entirety of which is incorporated herein by reference.

BACKGROUND

1. Technical Field

The present invention relates to a permanent magnet type motor in which a permanent magnet is incorporated into a rotor core, and a method for manufacturing the permanent magnet type motor.

2. Description of the Related Arts

Motors using a permanent magnet are broadly classified into a surface permanent magnet type (SPM motor) in which the permanent magnet is disposed on a surface of a shaft, and an interior permanent magnet type motor (IPM motor) in which the permanent magnet is incorporated into a rotor core.

Rotor shapes of the IPM motor are very diverse, and a method for manufacturing the rotor is adopted depending on the respective shapes and intended purposes of the motor. Generally, a manufacturing method has been adopted in which after the rotor core is shrinkage fitted to the shaft, an adhesive is applied to both sides of a magnet insertion hole and the permanent magnet, and the permanent magnet is inserted into the magnet insertion hole from both end surfaces of the rotor core to harden the adhesive.

Since the magnet insertion hole is opened in the both end surfaces of the rotor core, the adhesive having high-viscosity to an extent that does not droop out of the magnet insertion hole is used.

As a technique concerning the incorporation of the permanent magnet, a method for manufacturing the motor is disclosed in which permanent magnet embedding holes penetrating in an axial direction are provided at a plurality of locations in the rotor core, the permanent magnet is directly coated using the adhesive, and then the permanent magnet and the rotor core are also bonded to each other (for example, see Japanese Patent Application Laid-Open Publication No. 2003-199303).

SUMMARY

Incidentally, in the method for manufacturing the rotor of the related art, in order to prevent the adhesive from dropping out of the magnet insertion hole, a high-viscosity adhesive has been used.

However, it is difficult to apply a high-viscosity adhesive with poor fluidity onto an inner surface of the magnet insertion hole. Particularly, since a small motor has a small magnet insertion hole, it was difficult to evenly apply the high-viscosity adhesive onto the inner surface of the magnet insertion hole, and the irregularity of manufacturing of the rotor increased.

Furthermore, after the permanent magnet is inserted into the magnet insertion hole, since there was a need for a work of wiping off the adhesive protruding from the magnet insertion hole, a manufacturing efficiency of the rotor dropped, and a manufacturing cost increased.

In the technique of Japanese Patent Application Laid-Open Publication No. 2003-199303, the adhesive is directly coated to the permanent magnet. However, particularly, since a small motor has a small magnet insertion hole, even when the adhesive is directly coated to the permanent magnet, the extra adhesive protrudes from the magnet insertion hole when the permanent magnet is inserted into the magnet insertion hole.

The invention has been made in view of the above-mentioned circumstances, and an object thereof is to provide a permanent magnet type motor of high quality and a method for manufacturing the permanent magnet type motor capable of reducing the manufacturing cost by optimization of the rotor manufacturing and lowering the manufacturing irregularity of the rotor.

According to an aspect of the invention for achieving the object mentioned above, there is provided a method for manufacturing a permanent magnet type motor in which a permanent magnet is incorporated into a rotor core stack, the method having a process of forming the rotor core stack; a process of injecting a low-viscosity adhesive; and a process of bonding and fixing the permanent magnet.

In the process of forming the rotor core stack, the rotor core stack is formed by combining a plurality of core sheets having a magnet insertion hole for incorporating the permanent magnet with a core sheet not having the magnet insertion hole, and disposing the core sheet not having the magnet insertion hole in one end in a stacking direction.

In the process of injecting the low-viscosity adhesive, the low-viscosity adhesive is injected into the magnet insertion hole in which one end is blocked by the core sheet not having the magnet insertion hole.

In the process of bonding and fixing the permanent magnet, the permanent magnet is inserted into the magnet insertion hole into which the low-viscosity adhesive is injected, thereby bonding and fixing the permanent magnet.

Furthermore, according to another aspect of the invention, there is provided a permanent magnet type motor in which a plurality of permanent magnets are incorporated into a rotor core stack, in which the rotor core stack is formed, and the permanent magnet is bonded and fixed.

The rotor core stack is formed, by combining a plurality of core sheets having a magnet insertion hole for incorporating the permanent magnet with a core sheet not having the magnet insertion hole, and disposing the core sheet not having the magnet insertion hole in one end of a stacking direction.

The permanent magnet is bonded and fixed by injecting the low-viscosity adhesive into the magnet insertion hole in which one end is blocked by the core sheet not having the magnet insertion hole, and inserting the permanent magnet into the magnet insertion hole into which the low-viscosity adhesive is injected.

According to the invention, the rotor core stack is formed by disposing the core sheet not having the magnet insertion hole in one end of the stacking direction. Since one end of the magnet insertion hole is blocked by the core sheet not having the magnet insertion hole, the magnet insertion hole has a container shape, and thus the low-viscosity adhesive does not leak. After a fixed quantity of low-viscosity adhesive is injected into the magnet insertion hole, the permanent magnet is inserted from an opening end of the magnet insertion hole.

Thus, the invention is able to prevent the low-viscosity adhesive from protruding from the magnet insertion hole, and reduce the manufacturing cost by optimization of the rotor manufacturing. Furthermore, since the low-viscosity adhesive can be evenly applied onto an inner surface of the magnet insertion hole, the permanent magnet type motor of high quality can be provided by reducing the manufacturing irregularity of the rotor.

DETAILED DESCRIPTION

Herein below, permanent magnet type motors and methods for manufacturing the permanent magnet type motors according to first to fifth embodiments, will be described with reference to the drawings.

The permanent magnet type motors and the methods for manufacturing the permanent magnet type motors according to the first to fifth embodiments are capable of reducing the manufacturing cost by optimization of the rotor manufacturing, by preventing a low-viscosity adhesive from protruding from a magnet insertion hole. Furthermore, since the low-viscosity adhesive can be evenly applied onto an inner surface of the magnet insertion hole, the permanent magnet type motor of high quality can be achieved by reducing the manufacturing irregularity of the rotor.

First Embodiment

[Configuration of Permanent Magnet Type Motor]

Figure 1:
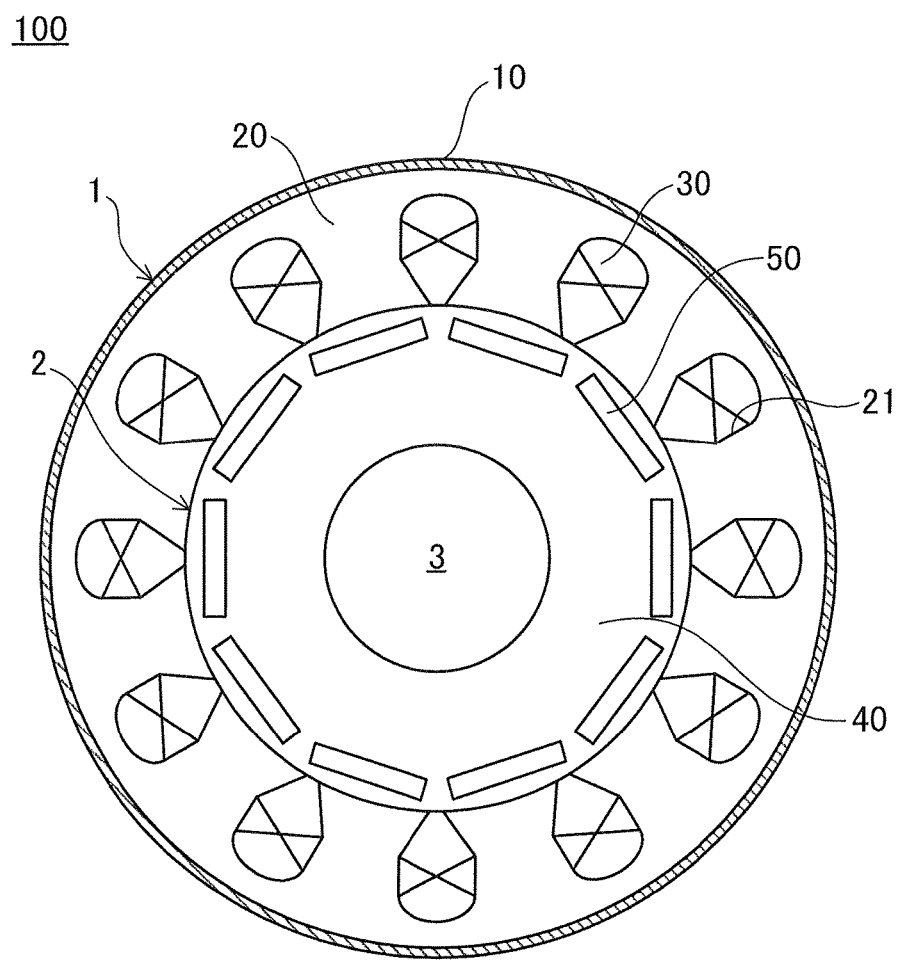
FIG. 1 is a schematic view of an overall configuration of a permanent magnet type motor.
Figure 2A:
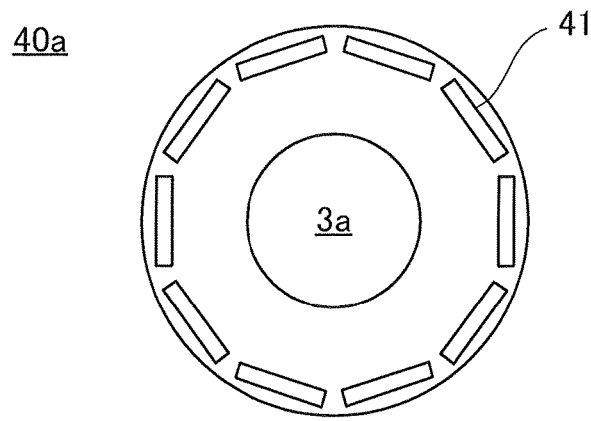
FIGS. 2A to 2C are plan views of a core sheet that forms a rotor core stack.
Figure 2B:
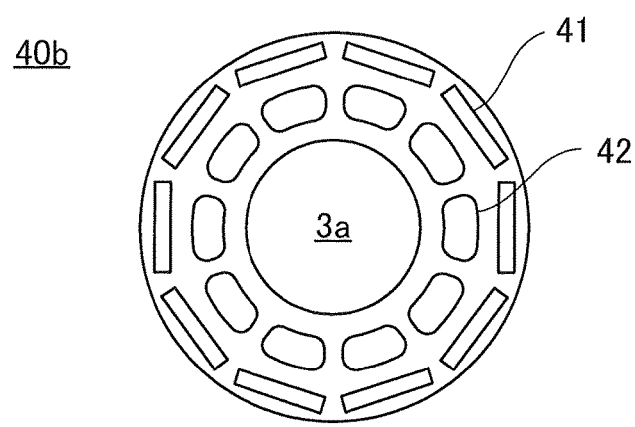
Figure 2C:
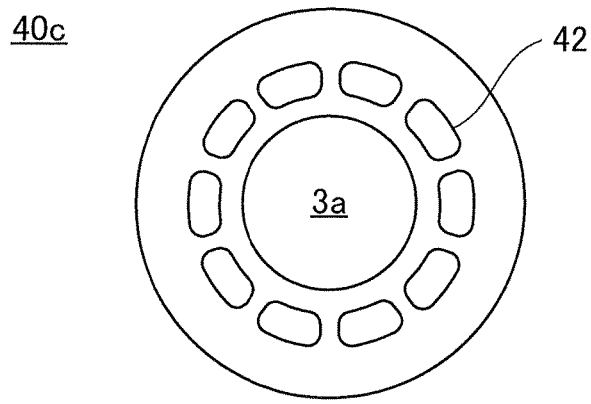
Figure 3:
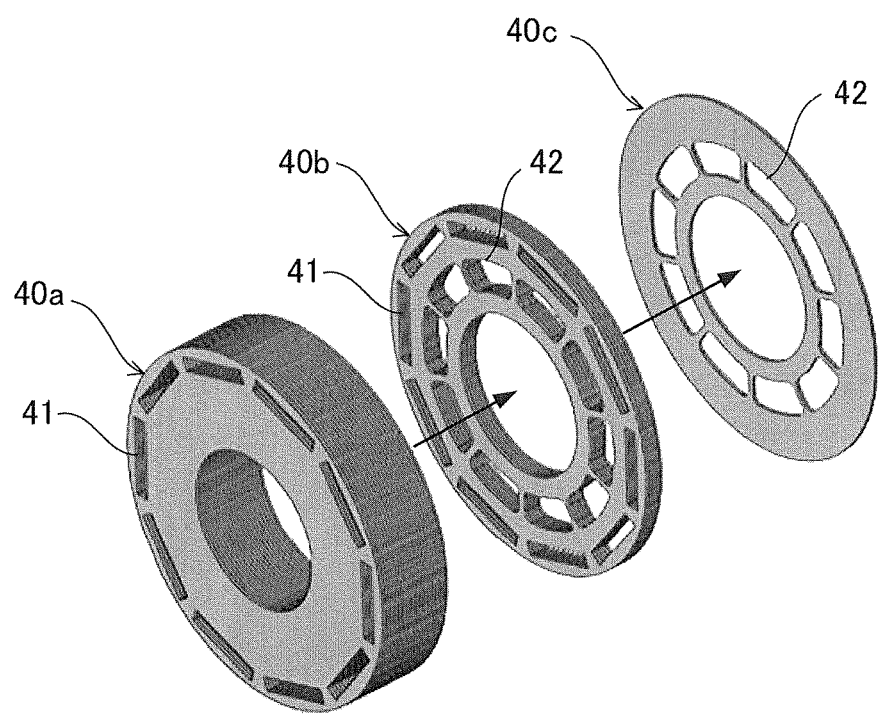
FIG. 3 is an exploded perspective view of the rotor core stack.
Figure 4A:
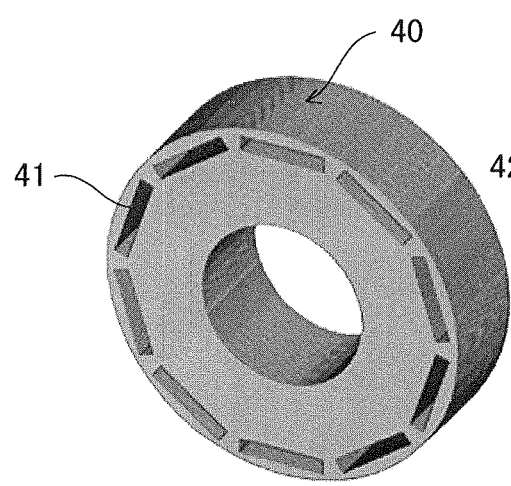
FIGS. 4A and 4B are perspective views of a magnet insertion hole side and a balancing hole side of the rotor core stack.
Figure 4B:
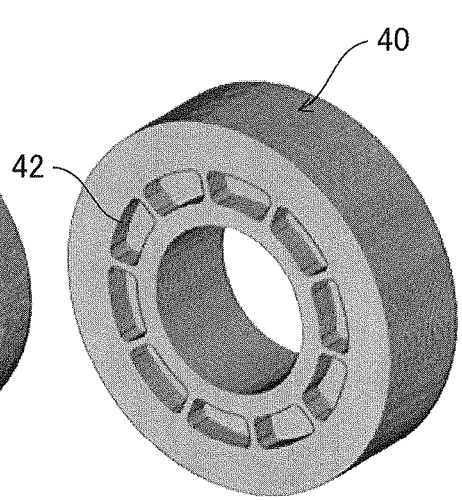
Figure 5A:
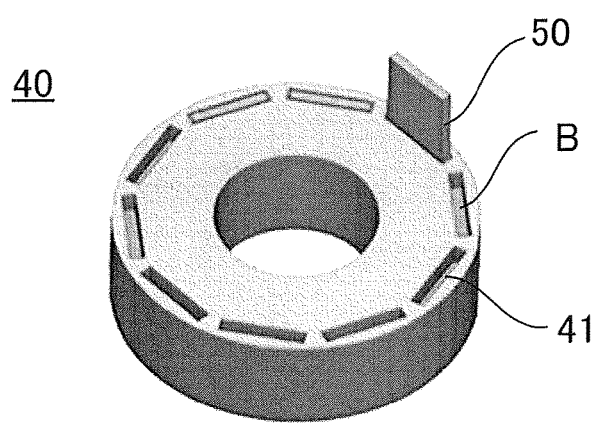
FIGS. 5A and 5B are schematic views of an inserted situation of the permanent magnet after the adhesive is injected.
Figure 5A:
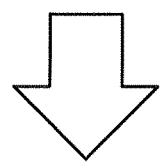
Figure 5B:
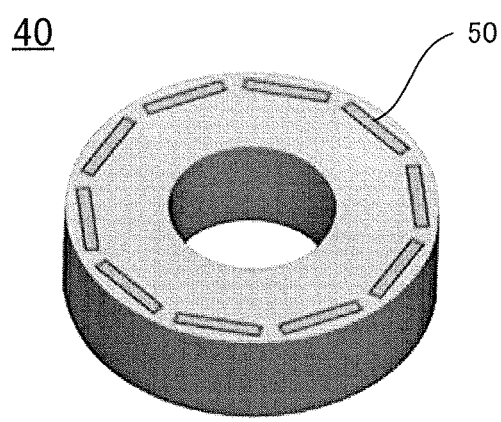
Figure 6A:
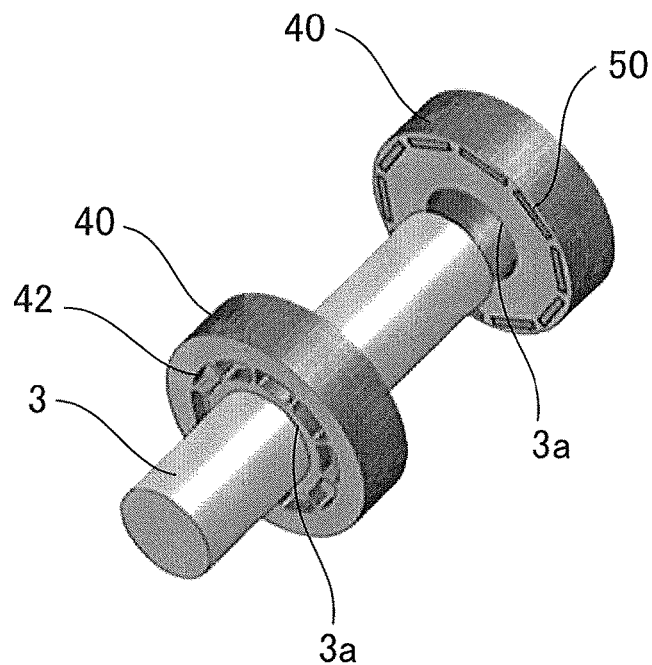
FIGS. 6A and 6B are perspective views of positioned and fitted situations of a shaft and the rotor core stack.
Figure 6B:
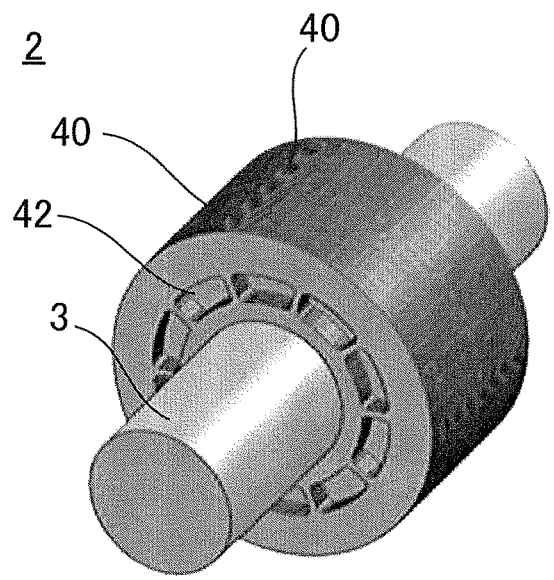

First, a configuration of a permanent magnet type motor of the first embodiment will be described with reference to FIGS. 1 to 6B. FIG. 1 is a schematic view of an overall configuration of the permanent magnet type motor. FIGS. 2A to 2C are plan views of a core sheet that forms a rotor core stack. FIG. 3 is an exploded perspective view of the rotor core stack. FIGS. 4A and 4B are perspective views of a magnet insertion hole side and a balancing hole side of the rotor core stack. FIGS. 5A and 5B are schematic views of an insertion situation of the permanent magnet after an adhesive is injected. FIGS. 6A and 6B are perspective views of positioning and fitting situation of a shaft and the rotor core stack.

As an example of the permanent magnet type motor of the embodiment, for example, an IPM motor (Interior Permanent Magnet Motor) is adopted. A permanent magnet type motor 100 illustrated in FIG. 1 is an IPM motor with 10 poles and 12 slots, and includes a stator 1 and a rotor 2.

As illustrated in FIG. 1, the stator 1 has a yoke 10, a stator core 20, and coils 30.

The yoke 10 is a cylindrical body-shaped metallic member. The yoke 10 has a function of closing a line of magnetic force to maximize an electromagnetic induction effect of permanent magnets 50 described below. Furthermore, the yoke 10 also has a function of preventing peripheral devices of the motor 100 from receiving an influence of magnetic field due to the electromagnetic induction.

As a constituent material of the yoke 10, for example, although soft magnetic materials such as a silicon steel plate are used, the material is not limited to the illustrated material.

The stator core 20 is a thick cylindrical body-shaped metallic member provided along an inner surface of the yoke 10. On an inner circumferential side of the stator core 20, a plurality of slots 21 as spaces for accommodating the coils 30 are radially formed to face the rotor 2 in a divided manner.

As a constituent material of the stator core 20, for example, although soft magnetic materials such as a silicon steel plate are used similarly to the yoke 10, the material is not limited to the illustrated material.

The coils 30 are disposed inside the slots 21. The number of the slots 21 corresponds to the number of the coils 30. In the embodiment, although twelve slots 21 and coils 30 are disposed, the number of the slots 21 and the coils 30 is not limited.

The rotor 2 is provided around a shaft 3 and has a rotor core stack 40 and permanent magnets 50. The shaft 3 serves as a rotation center of the rotor 2.

The rotor core stack 40 is a thick cylindrical body-shaped metallic member provided around the shaft 3. In the embodiment, the rotor core stack 40 is formed as a rotor core stack by stacking a plurality of core sheets.

As illustrated in FIGS. 2A to 2C, the rotor core stack 40 of the embodiment includes three kinds of core sheets 40a, 40b, and 40c. In a central portion of each of the core sheets 40a, 40b, and 40c, a shaft insertion hole 3a for inserting and fixing the shaft 3 is formed.

In the core sheet 40a, a plurality of magnet insertion holes 41 for incorporating the permanent magnet are opened near an outer circumferential portion thereof. The plurality of magnet insertion holes 41 are equally disposed along a circumferential direction of the core sheet 40a.

The core sheet 40b has the same configuration as the core sheet 40a, and a plurality of magnet insertion holes 41 are opened near an outer circumferential portion thereof. Furthermore, in the core sheet 40b, a plurality of balancing holes 42 are opened on the inner side of the magnet insertion holes 41 in a radial direction. The plurality of balancing holes 42 are equally disposed along the circumferential direction of the core sheet 40b.

The core sheet 40c has the same configuration as the core sheet 40b, and a plurality of balancing holes 42 are opened. The magnet insertion holes 41 are not opened in the core sheet 40c.

As a constituent material of each of the core sheets 40a, 40b, and 40c, for example, although soft magnetic materials such as a silicon steel plate are used, the material is not limited to the illustrated material.

As illustrated in FIGS. 3, 4A and 4B, the rotor core stack 40 is formed by sequentially stacking the core sheet 40a, the core sheet 40b, and the core sheet 40c. A plurality of pieces of the core sheets 40a and 40b having the magnet insertion holes 41 are stacked, respectively. At least one core sheet 40c not having the magnet insertion holes 41 is used.

The core sheet 40c not having the magnet insertion holes 41 is placed in one end in a stacking direction of the rotor core stack 40. One end of the magnet insertion holes 41 is blocked by the core sheet 40c not having the magnet insertion holes.

The permanent magnets 50 have a plate shape. As the permanent magnets 50, for example, although a rare-earth magnet such as a neodymium magnet is adopted, the material is not limited to the illustrated material.

The permanent magnets 50 are bonded and fixed into the magnet insertion holes 41 of the rotor core stack 40. Specifically, as illustrated in FIG. 5A, a fixed quantity of low-viscosity adhesive B is injected into the magnet insertion holes 41 in which one end is blocked. Moreover, as illustrated in FIG. 5B, the permanent magnets 50 are inserted into the magnet insertion holes 41 into which the low-viscosity adhesive B is injected, and the permanent magnets 50 are bonded and fixed.

The plurality of permanent magnets 50 are equally disposed along the circumferential direction of the rotor core stack 40. In the embodiment, although the permanent magnets 50 of 10 poles are disposed, the number of the permanent magnets 50 is not limited. For example, the permanent magnets 50 are disposed in a magnetic pole opposition (N-N, S-S) magnetization manner in the circumferential direction of the rotor core stack 40.

A pair of rotor core stacks 40 into which the permanent magnets 50 are incorporated is produced in regard to one permanent magnet type motor 100. As illustrated in FIGS. 6A and 6B, the pair of rotor core stacks 40 and 40 into which the permanent magnets 50 are incorporated is shrinkage fitted to the shaft 3, by causing exposed surface sides of the permanent magnets 50 to face each other and positioning the exposed surface sides in the axial direction and the rotary direction. The pair of rotor core stacks 40 and 40 is shrinkage fitted to the shaft 3 by shifting the positions in the rotary direction to each other.

As illustrated in FIG. 6B, in a completed state of the rotor 2 fixed to the shaft 3, the permanent magnets 50 cannot be visually recognized from an external appearance.

[Operation of Permanent Magnet Type Motor and Manufacturing Method]

Figure 7:
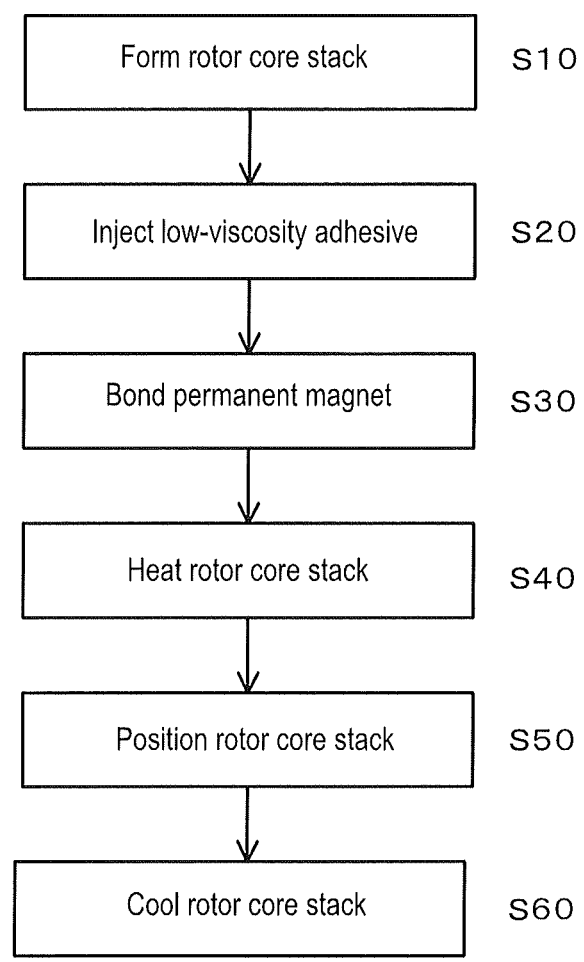
FIG. 7 is a flowchart of a method for manufacturing a permanent magnet type motor of a first embodiment.
Figure 8A:
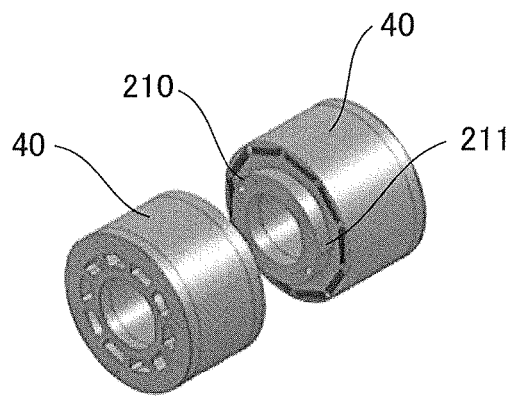
FIGS. 8A to 8D are perspective views of a seal case structure of a rotor core stack, and side views of a seal case male portion and a seal case female portion of a second embodiment.
Figure 8B:
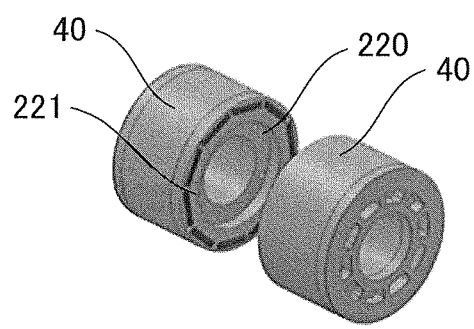
Figure 8C:
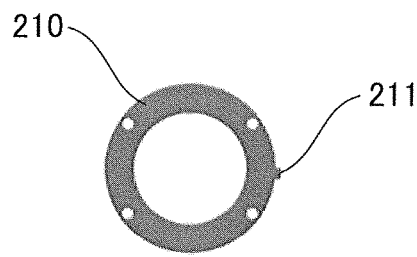
Figure 8D:
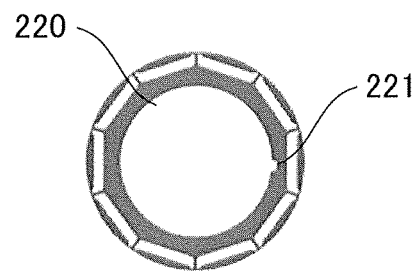

Next, an operation of a permanent magnet type motor 100 according to the first embodiment, and a method for manufacturing the permanent magnet type motor 100 according to the first embodiment will be described with reference to FIGS. 1 to 7. FIG. 7 is a flowchart of a method for manufacturing the permanent magnet type motor.

As illustrated in FIG. 1, the rotor 2 of the permanent magnet type motor 100 according to the embodiment is configured so that a plurality of permanent magnets 50 are incorporated into the rotor core stack 40. The plurality of permanent magnets 50 are disposed so as to be subjected to magnetic pole opposition (N-N, S-S) magnetization in the circumferential direction.

Meanwhile, the stator 1 has a plurality of coils 30 that are provided to surround the rotor 2 and are arranged radially in the circumferential direction.

That is, according to the permanent magnet type motor 100 of the embodiment, electric current flows through the coils 30 of the stator 1 so that the electric current intersects with magnetic flux generated from the permanent magnets 50 of the rotor 2. When the magnetic flux of the permanent magnets 50 intersects with the electric current flowing through the coils 30, the permanent magnet type motor 100 of the embodiment generates circumferential driving force in the coils 30 by electromagnetic induction operation, thereby rotating the rotor 2 around the shaft 3.

A method for manufacturing the permanent magnet type motor 100 according to the first embodiment has a process of forming a rotor core stack, a process of injecting a low-viscosity adhesive, and a process of bonding and fixing a permanent magnet. Furthermore, the method for manufacturing the permanent magnet type motor 100 according to the first embodiment has a process of heating the rotor core stack, a process of positioning the rotor core stack, and a cooling process for fitting and fixing the rotor core stack.

As illustrated in FIG. 7, the method for manufacturing the permanent magnet type motor 100 according to the first embodiment, first, performs the process of forming the rotor core stack (S10).

As illustrated in FIGS. 2A to 4B, the forming process of the rotor core stack 40 sequentially stacks the core sheet 40a, the core sheet 40b, and the core sheet 40c to form the rotor core stack 40. The core sheet 40a has only the magnet insertion holes 41, in addition to the shaft insertion hole 3a. The core sheet 40b has the magnet insertion holes 41 and the balancing holes 42, in addition to the shaft insertion hole 3a. The core sheet 40c has only the balancing holes 42, in addition to the shaft insertion hole 3a. A plurality of pieces of the core sheets 40a and 40b having the magnet insertion holes 41 are stacked, respectively. At least a piece of the core sheet 40c not having the magnet insertion holes 41 is used.

When the rotor core stack is formed, the core sheet 40c not having the magnet insertion holes 41 is disposed in one end in the stacking direction. One end of the magnet insertion holes 41 is blocked by the core sheet 40c not having the magnet insertion hole.

Next, as illustrated in FIG. 7, in the method for manufacturing the permanent magnet type motor 100 according to the first embodiment, the process of injecting the low-viscosity adhesive is performed (S20).

As illustrated in FIG. 5A, in the process of injecting the low-viscosity adhesive, a fixed quantity of the low-viscosity adhesive B is injected into the magnet insertion holes 41 in which one end is blocked by the core sheet 40c not having the magnet insertion holes 41 from opening ends of the magnet insertion holes 41.

Next, as illustrated in FIG. 7, in the method for manufacturing the permanent magnet type motor 100 according to the first embodiment, the process of bonding and fixing the permanent magnet is performed (S30).

As illustrated in FIG. 5B, in the process of bonding and fixing the permanent magnet, the permanent magnets 50 are bonded and fixed by inserting the permanent magnets 50 into the magnet insertion holes 41 having the low-viscosity adhesive B after injection of the low-viscosity adhesive B.

Next, as illustrated in FIG. 7, in the method for manufacturing the permanent magnet type motor 100 according to the first embodiment, the process of heating the rotor core stack is performed (S40).

In the heating process of the rotor core stack, the pair of rotor core stacks 40 and 40, into which the permanent magnets 50 are incorporated, is accommodated in a heating device, and the rotor core stacks 40 and 40 are heated to a temperature suitable for shrinkage fit.

Next, as illustrated in FIG. 7, in the method for manufacturing the permanent magnet type motor 100 according to the first embodiment, the process of positioning the rotor core stack is performed (S50).

As illustrated in FIG. 6A, in the process of positioning the rotor core stack, the exposed surface sides of the permanent magnets 50 of the pair of the thermally expanded rotor core stacks 40 and 40 are caused to face each other, and the shaft 3 is inserted into the shaft insertion hole 3a. Next, as illustrated in FIG. 6B, in the positioning process of the rotor core stack, the facing surfaces (exposed surfaces of the permanent magnets 50) of the pair of rotor core stacks 40 and 40 are caused to abut against each other to perform positioning of the rotor core stacks 40 and 40 in the axial direction and the rotary direction. The pair of rotor core stacks 40 and 40 is fitted and fixed to the shaft 3 by mutually shifting the position in the rotary direction.

Next, as illustrated in FIG. 7, in the method for manufacturing the permanent magnet type motor 100 according to the first embodiment, the process of cooling the rotor core stack is performed (S60).

In the cooling process of the rotor core stack, the pair of rotor core stacks 40 and 40 subjected to the positioning process is cooled, and the rotor core stacks 40 and 40 are fitted and fixed to the shaft 3.

The rotor 2 fixed to the shaft 3 is completed through the above-mentioned processes. As illustrated in FIG. 6B, in the completed state of the rotor 2 fixed to the shaft 3, the permanent magnets 50 cannot be visually recognized from an external appearance.

Particularly, a small permanent magnet type motor 100 has a small magnet insertion hole 41. Thus, in order to improve a bonding quality between the permanent magnet 50 and the rotor core stack 40, there is a need to select not a high-viscosity adhesive with poor fluidity but a low-viscosity adhesive B with good fluidity.

The rotor core stack 40 of the embodiment is formed, by disposing the core sheet 40c not having the magnet insertion holes 41 in one end in the stacking direction. One end of the magnet insertion holes 41 is blocked by the core sheet 40c not having the magnet insertion holes 41.

Before the permanent magnets 50 are inserted into the magnet insertion holes 41, a fixed quantity of the low-viscosity adhesive B is injected from the opening ends of the magnet insertion holes 41. Since one end of the magnet insertion holes 41 is blocked, the magnet insertion holes 41 have container shapes, and thus the low-viscosity adhesive B does not leak.

After the low-viscosity adhesive B is injected into the magnet insertion holes 41, the permanent magnets 50 are inserted from the opening ends of the magnet insertion holes 41. A quantity of injection of the low-viscosity adhesive B is set to an extent that the low-viscosity adhesive B does not leak from the opening ends of the magnet insertion holes 41 when the permanent magnets 50 are inserted. As long as the quantity is managed to an extent that the low-viscosity adhesive B does not leak, the low-viscosity adhesive B does not protrude from the magnet insertion holes 41, and there is no need for a wiping work of an adhesive.

Accordingly, the permanent magnet type motor 100 and the method for manufacturing the permanent magnet type motor 100 according to the embodiment are able to reduce the manufacturing cost by optimization of manufacturing of the rotor 2, by preventing the low-viscosity adhesive B from protruding from the magnet insertion holes 41.

Furthermore, since the low-viscosity adhesive B can be evenly applied onto the inner surface of the magnet insertion hole 41, it is possible to provide the permanent magnet type motor 100 of high quality by reducing the manufacturing irregularity of the rotor 2.

Furthermore, according to the permanent magnet type motor 100 and the method for manufacturing the permanent magnet type motor 100 according to the embodiment, a pair of rotor core stacks 40 and 40 is provided for each permanent magnet type motor 100. Accordingly, by fitting and fixing the pair of rotor core stacks 40 and 40 to the shaft 3 so as to be shifted to each other in the rotary direction, a two-stage skew structure is formed, and thus it is possible to achieve the permanent magnet type motor 100 in which the cogging torque is reduced.

Second Embodiment

Figure 9A:
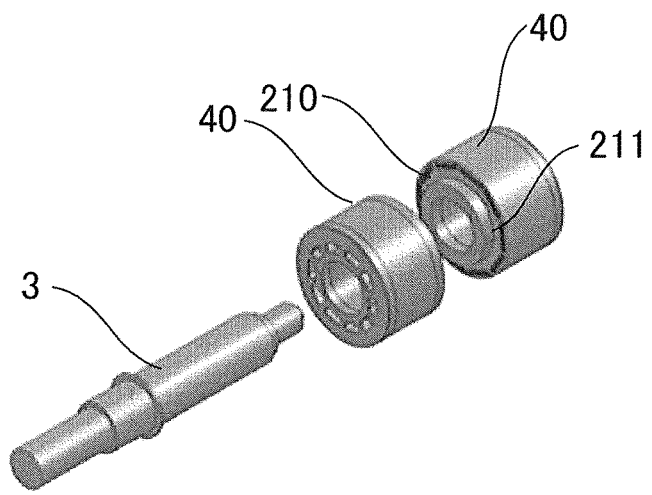
FIGS. 9A to 9C are an exploded perspective view of a positioning structure of the rotor core stack, and perspective views of a rotor of the second embodiment.
Figure 9B:
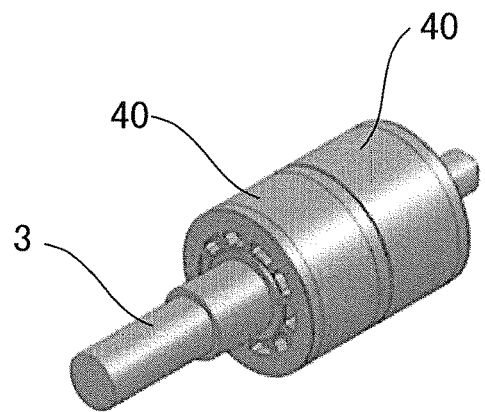
Figure 9C:
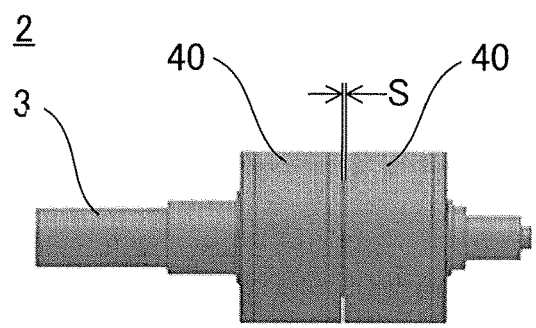

Next, a permanent magnet type motor 200 and a method for manufacturing the permanent magnet type motor 200 according to a second embodiment will be described with reference to FIGS. 7 to 9C. FIGS. 8A to 8D are perspective views of a seal case structure of a rotor core stack, and side views of a seal case male portion and a seal case female portion of the second embodiment. FIGS. 9A to 9C are an exploded perspective view of a positioning structure of the rotor core stack, and perspective views of a rotor of the second embodiment. In addition, the same components as the permanent magnet type motor 100 according to the first embodiment are denoted by the same reference numerals, and the description thereof will not be repeated.

As illustrated in FIGS. 8A to 8D, the second embodiment is different from the first embodiment in that the pair of rotor core stacks 40 and 40 is positioned by a seal case structure.

In the permanent magnet type motor 200 according to the second embodiment, a cylindrical body-shaped seal case male portion 210 is formed on one facing surface of the pair of rotor core stacks 40, and a cylindrical groove-shaped seal case female portion 220 is formed on the other facing surface thereof. The seal case male portion 210 has a convex portion 211 protruding outwards the rotor core stack 40 in the radial direction. The seal case female portion 220 has a concave portion 221 engaged with the convex portion 211 of the seal case male portion 210.

As illustrated in FIGS. 9A to 9C, the pair of rotor core stacks 40 and 40 performs the positioning of the rotor core stacks 40 and 40 in the axial direction by inserting the seal case male portion 210 into the seal case female portion 220, when the shaft 3 is inserted into the shaft insertion hole 3a to perform positioning. Furthermore, the convex portion 211 of the seal case male portion 210 is engaged with the concave portion 221 of the seal case female portion 220 to perform the positioning of the pair of rotor core stacks 40 and 40 in the rotary direction.

When the skew structure is formed, a height of the seal case male portion 210 is preferably set to be greater than a depth of the seal case female portion 220 to provide a gap S of approximately 0.5 to 1 mm between the pair of rotor core stacks 40 and 40.

In the method for manufacturing the permanent magnet type motor 200 according to the second embodiment, the positioning in the axial direction is performed at a predetermined gap S of approximately 0.5 to 1 mm by the seal case structure formed on the facing surfaces of the pair of rotor core stacks 40 and 40 in the positioning process (S50) of the rotor core stack of FIG. 7. When the seal case male portion 210 is inserted into the seal case female portion 220, the convex portion 211 of the seal case male portion 210 is engaged with the concave portion 221 of the seal case female portion 220 to perform the positioning in the rotary direction.

The second embodiment exhibits basically the same effects as the first embodiment. Particularly, according to the second embodiment, it is possible to easily perform the positioning in the axial direction, only by inserting the seal case male portion 210 into the seal case female portion 220 formed on the facing surface of the pair of rotor core stacks 40 and 40.

Furthermore, according to the second embodiment, it is possible to easily perform the positioning in the rotary direction, only by engaging the convex portion 211 of the seal case male portion 210 with the concave portion 221 of the seal case female portion 220, when the seal case male portion 210 is inserted into the seal case female portion 220.

Additionally, when a skew structure is formed, by providing a predetermined gap between the pair of rotor core stacks 40 and 40, there is an effect of suppressing the magnetic flux that is short-circuited between the rotor core stacks 40 and 40. Accordingly, the second embodiment exhibits a specific effect that is able to suppress a torque drop, while reducing the cogging torque.

Third Embodiment

Figure 10A:
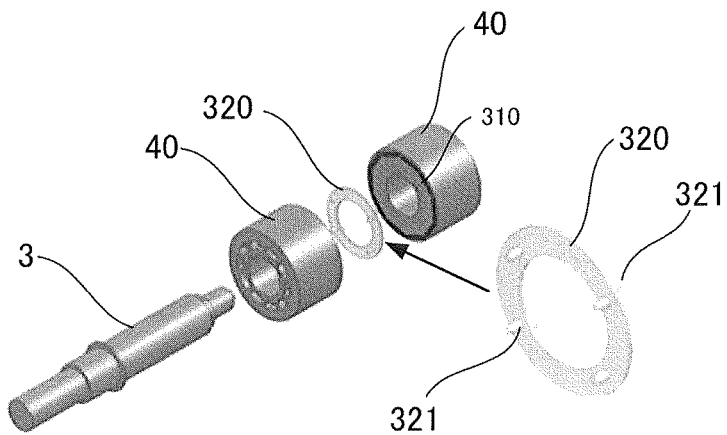
FIGS. 10A to 10C are an exploded perspective view of a positioning structure of a rotor core stack, and perspective views of a rotor of a third embodiment.

Next, a permanent magnet type motor 300 and a method for manufacturing the permanent magnet type motor 300 according to a third embodiment will be described with reference to FIGS. 7 and 10A to 10 C. FIGS. 10A to 10C are an exploded perspective view of a positioning structure of a rotor core stack, and perspective views of a rotor of the third embodiment. In addition, the same components as the permanent magnet type motor 100 according to the first embodiment are denoted by the same reference numerals, and the description thereof will not be repeated.

Figure 10B:
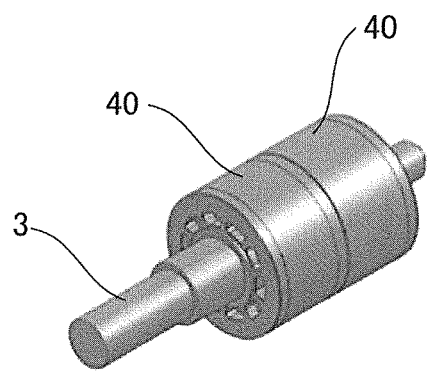
Figure 10C:
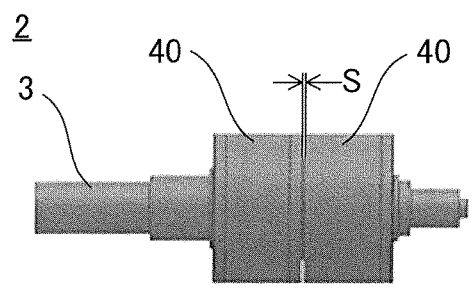

As illustrated in FIGS. 10A to 10C, the third embodiment is different from the first embodiment in that the pair of rotor core stacks 40 and 40 is positioned by a thin ring-shaped coupling 320.

The permanent magnet type motor 300 according to the third embodiment has a plurality of insertion holes 310 formed on the respective facing surfaces of the pair of rotor core stacks 40 and 40. The plurality of insertion holes 310 are disposed equally at four positions along the circumferential direction of the rotor core stacks 40 and 40. Specifically, the plurality of insertion holes 310 are opened in a core sheet 40a that has only the magnet insertion holes 41.

When the shaft 3 is inserted into the shaft insertion hole 3a of the pair of rotor core stacks 40 and 40 to perform the positioning, the ring-shaped coupling 320 having a plurality of pins 321 engaged with the plurality of insertion holes 310 is interposed between the pair of rotor core stacks 40 and 40. The plurality of pins 321 are formed equally at four positions along the circumferential direction of both surfaces of the ring-shaped coupling 320. A gap S corresponding to the thickness of the ring-shaped coupling 320 is formed between the rotor core stacks 40 and 40.

In the method for manufacturing the permanent magnet type motor 300 according to the third embodiment, the positioning in the axial direction of the pair of rotor core stacks 40 and 40 is performed at a predetermined gap S via the ring-shaped coupling 320 in the positioning process (S50) of the rotor core stack of FIG. 7. When the pair of rotor core stacks 40 and 40 is disposed to face each other via the ring-shaped coupling 320, the plurality of pins 321 of the ring-shaped coupling 320 are engaged with the plurality of insertion holes 310 formed on the facing surfaces of the pair of rotor core stacks 40 and 40 to perform the positioning in the rotary direction.

The third embodiment exhibits basically the same effect as the first embodiment. Particularly, according to the third embodiment, it is possible to easily perform the positioning in the axial direction, only by interposing the ring-shaped coupling 320 between the pair of rotor core stacks 40 and 40.

Furthermore, according to the third embodiment, it is possible to easily perform the positioning in the rotary direction, only by engaging the plurality of pins 321 of the ring-shaped coupling 320 with the plurality of insertion holes 310 formed on the facing surfaces of the pair of rotor core stacks 40 and 40.

Furthermore, when a skew structure is formed, only by providing the ring-shaped coupling 320, the gap S corresponding to the thickness of the ring-shaped coupling 320 can be provided between the pair of rotor core stacks 40 and 40. By providing a predetermined gap S between the pair of rotor core stacks 40 and 40, there is an effect that suppresses the magnetic flux that is short-circuited between the rotor core stacks 40 and 40. Accordingly, the third embodiment exhibits a specific effect that is able to suppress the torque drop, while reducing the cogging torque.

Fourth Embodiment

Figure 11A:
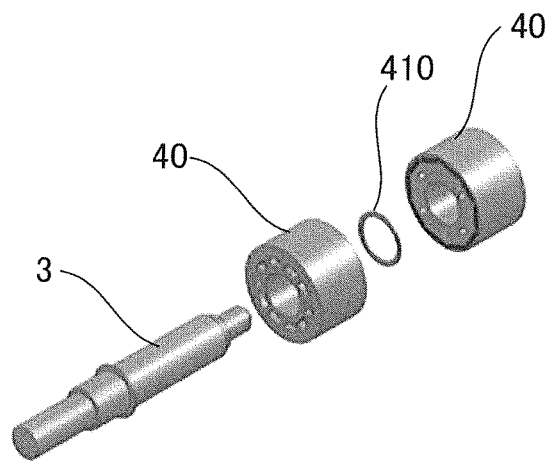
FIGS. 11A to 11C are an exploded perspective view of a positioning structure of a rotor core stack, and perspective views of a rotor of a fourth embodiment.
Figure 11B:
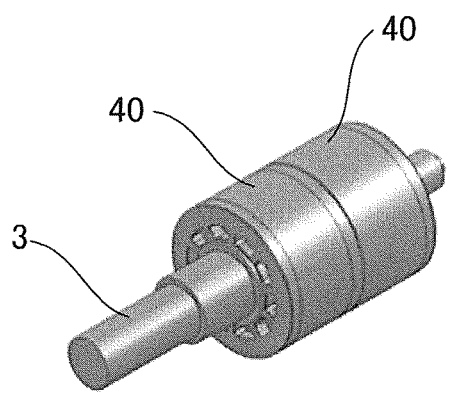
Figure 11C:
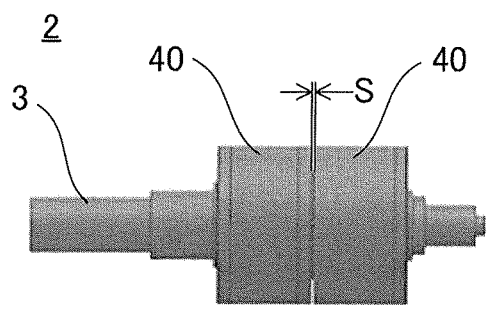

Next, a permanent magnet type motor 400 and a method for manufacturing the permanent magnet type motor 400 according to a fourth embodiment will be described with reference to FIGS. 7 and 11A to 11C. FIGS. 11A to 11C are an exploded perspective view of a positioning structure of a rotor core stack, and perspective views of a rotor of a fourth embodiment. In addition, the same components as the permanent magnet type motor 100 according to the first embodiment are denoted by the same reference numerals, and the description thereof will not be repeated.

As illustrated in FIGS. 11A to 11C, the fourth embodiment is different from the first embodiment in that the pair of rotor core stacks 40 and 40 is positioned by a spacer 410.

In the permanent magnet type motor 400 according to the fourth embodiment, a thin ring-shaped spacer 410 is interposed between the rotor core stacks 40 and 40, when the shaft 3 is inserted into the shaft insertion hole 3a of the pair of rotor core stacks 40 and 40 to perform the positioning. A gap S corresponding to the thickness of the spacer 410 is formed between the rotor core stacks 40 and 40.

In the method for manufacturing the permanent magnet type motor 400 according to the fourth embodiment, the positioning in the axial direction of the pair of rotor core stacks 40 and 40 is performed at a predetermined gap S via the ring-shaped spacer 410 in the positioning process (S50) of the rotor core stack of FIG. 7. The positioning in the rotary direction is performed using an assembling jig.

The fourth embodiment exhibits basically the same effect as the first embodiment. Particularly, according to the fourth embodiment, it is possible to easily perform the positioning in the axial direction, only by interposing the ring-shaped spacer 410 between the pair of rotor core stacks 40 and 40.

Furthermore, when a skew structure is formed, only by providing the spacer 410, the gap S corresponding to the thickness of the spacer 410 can be provided between the pair of rotor core stacks 40 and 40. By providing a predetermined gap S between the pair of rotor core stacks 40 and 40, there is an effect that suppresses the magnetic flux that is short-circuited between the rotor core stacks 40 and 40. Accordingly, the fourth embodiment exhibits a specific effect that is able to suppress the torque drop, while reducing the cogging torque.

Fifth Embodiment

Figure 12A:
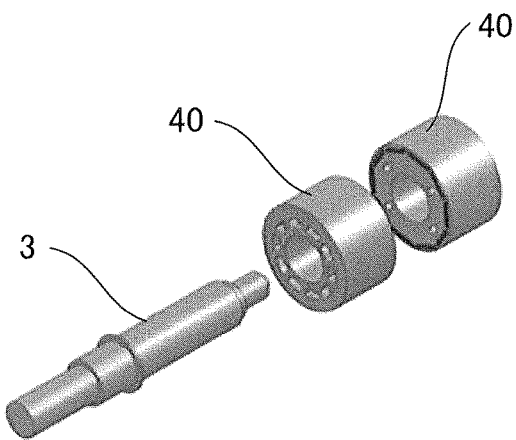
FIGS. 12A to 12C are an exploded perspective view of a positioning structure of a rotor core stack, and perspective views of a rotor of a fifth embodiment.
Figure 12B:
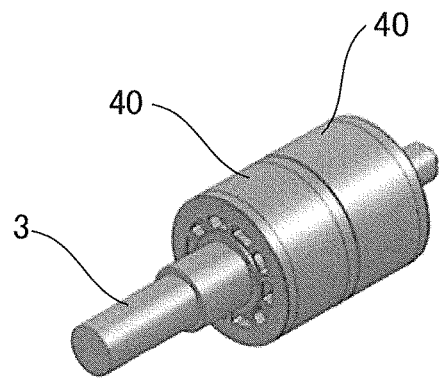
Figure 12C:
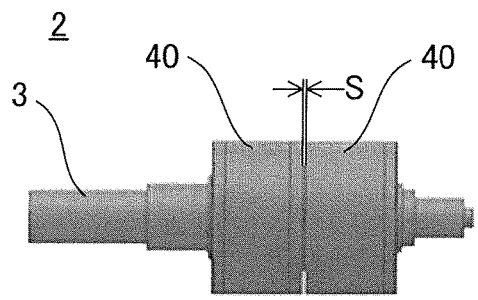

Next, a method for manufacturing a permanent magnet type motor 500 according to a fifth embodiment will be described with reference to FIGS. 7 and 12A to 12C. FIGS. 12A to 12C are an exploded perspective view of a positioning structure of a rotor core stack, and perspective views of a rotor of the fifth embodiment. In addition, the same components as the permanent magnet type motor 100 according to the first embodiment are denoted by the same reference numerals, and the description thereof will not be repeated.

As illustrated in FIGS. 12A to 12C, the fifth embodiment is different from the first embodiment in that a predetermined gap S is formed between the pair of rotor core stacks 40 and 40.

In the method for manufacturing the permanent magnet type motor 500 according to the fifth embodiment, the positioning of the pair of rotor core stacks 40 and 40 in the axial direction and the rotary direction is performed by an assembling jig, in the positioning process (S50) of the rotor core stack of FIG. 7. In the pair of rotor core stacks 40 and 40, only the shaft 3 is present, but nothing is interposed there between.

The fifth embodiment exhibits basically the same effect as the first embodiment. Particularly, the fifth embodiment has an effect that suppresses the magnetic flux that is short-circuited between the rotor core stacks 40 and 40, when a skew structure is formed, by providing a predetermined gap S between the pair of rotor core stacks 40 and 40. Accordingly, the fifth embodiment exhibits a specific effect that is able to suppress the torque drop, while reducing the cogging torque.

Although preferred embodiments of the invention have been described, these embodiments are examples for illustrating the invention, and the scope of the invention is not limited to only the embodiments. The invention can be carried out by various aspects different from the above-mentioned embodiments within the scope that does not depart from the spirit thereof.

What is claimed is:

1. A method for manufacturing a permanent magnet type motor in which a permanent magnet is incorporated into a rotor core stack, the method comprising:
   a process of forming the rotor core stack, by combining a first group constituted by a first core sheet having a magnet insertion hole for incorporating the permanent magnet and not having a balancing hole, a second group constituted by a second core sheet having the magnet insertion hole and the balancing hole, and a third group constituted by a third core sheet not having the magnet insertion hole and having the balancing hole, and disposing the third group in one end of a stacking direction;
   a process of injecting a fixed quantity of an adhesive into the magnet insertion hole in which one end is blocked by the third core sheet not having the magnet insertion hole; and
   a process of bonding and fixing the permanent magnet by inserting the permanent magnet into the magnet insertion hole into which the adhesive is injected;
   a process of heating a pair of rotor core stacks into which the permanent magnet is incorporated to a temperature suitable for shrinkage fit;
   a process of inserting a shaft into a shaft insertion hole of the pair of rotor core stacks subjected to thermal expansion and causing magnet exposed surfaces of the pair of rotor core stacks to face each other to perform positioning in an axial direction and in a rotary direction; and
   a cooling process for fitting and fixing the pair of rotor core stacks to the shaft;
   wherein the third core sheet not having the magnet insertion hole blocks and seals the magnet insertion hole such that the adhesive does not leak out of the magnet insertion hole;
   wherein the third core sheet not having the magnet insertion hole has the same thickness as each of the first and second core sheets having a magnet insertion hole;
   wherein magnet exposed surfaces of the pair of rotor core stacks abut against each other to face each other so that the permanent magnet is not visible external to the pair of rotor stacks.

2. A method for manufacturing a permanent magnet type motor in which a permanent magnet is incorporated into a rotor core stack, the method comprising:
   a process of forming the rotor core stack, by combining a first group constituted by a first core sheet having a magnet insertion hole for incorporating the permanent magnet and not having a balancing hole, a second group constituted by a second core sheet having the magnet insertion hole and the balancing hole, and a third group constituted by a third core sheet not having the magnet insertion hole and having the balancing hole, and disposing the third group in one end of a stacking direction;
   a process of injecting a fixed quantity of an adhesive into the magnet insertion hole in which one end is blocked by the third core sheet not having the magnet insertion hole; and
   a process of bonding and fixing the permanent magnet by inserting the permanent magnet into the magnet insertion hole into which the adhesive is injected;
   a process of heating a pair of rotor core stacks into which the permanent magnet is incorporated to a temperature suitable for shrinkage fit;
   a process of inserting a shaft into a shaft insertion hole of the pair of rotor core stacks subjected to thermal expansion and causing magnet exposed surfaces of the pair of rotor core stacks to face each other to perform positioning in an axial direction and in a rotary direction; and
   a cooling process for fitting and fixing the pair of rotor core stacks to the shaft;
   wherein the third core sheet not having the magnet insertion hole blocks and seals the magnet insertion hole such that the adhesive does not leak out of the magnet insertion hole;
   wherein the third core sheet not having the magnet insertion hole has the same thickness as each of the first and second core sheets having a magnet insertion hole;

wherein in the positioning process of the rotor core stacks, the pair of rotor core stacks is positioned in the axial direction at a predetermined gap via a ring-shaped coupling, and the pair of rotor core stacks is positioned in the rotary direction by engaging a plurality of pins of the ring-shaped coupling with a plurality of insertion holes formed on facing surfaces of the pair of rotor core stacks.

3. A method for manufacturing a permanent magnet type motor in which a permanent magnet is incorporated into a rotor core stack, the method comprising:

a process of forming the rotor core stack, by combining a first group constituted by a first core sheet having a magnet insertion hole for incorporating the permanent magnet and not having a balancing hole, a second group constituted by a second core sheet having the magnet insertion hole and the balancing hole, and a third group constituted by a third core sheet not having the magnet insertion hole and having the balancing hole, and disposing the third group in one end of a stacking direction;

a process of injecting a fixed quantity of an adhesive into the magnet insertion hole in which one end is blocked by the third core sheet not having the magnet insertion hole; and a process of bonding and fixing the permanent magnet by inserting the permanent magnet into the magnet insertion hole into which the adhesive is injected;

a process of heating a pair of rotor core stacks into which the permanent magnet is incorporated to a temperature suitable for shrinkage fit;

a process of inserting a shaft into a shaft insertion hole of the pair of rotor core stacks subjected to thermal expansion and causing magnet exposed surfaces of the pair of rotor core stacks to face each other to perform positioning in an axial direction and in a rotary direction; and a cooling process for fitting and fixing the pair of rotor core stacks to the shaft;

wherein the third core sheet not having the magnet insertion hole blocks and seals the magnet insertion hole such that the adhesive does not leak out of the magnet insertion hole;

wherein the third core sheet not having the magnet insertion hole has the same thickness as each of the first and second core sheets having a magnet insertion hole;

wherein in the positioning process of the rotor core stacks, the pair of rotor core stacks is positioned in the axial direction at a predetermined gap via a spacer, and the pair of rotor core stacks is positioned in the rotary direction using a positioning jig.

4. A method for manufacturing a permanent magnet type motor in which a permanent magnet is incorporated into a rotor core stack, the method comprising:

a process of forming the rotor core stack, by combining a first group constituted by a first core sheet having a magnet insertion hole for incorporating the permanent magnet and not having a balancing hole, a second group constituted by a second core sheet having the magnet insertion hole and the balancing hole, and a third group constituted by a third core sheet not having the magnet insertion hole and having the balancing hole, disposing the third group in one end of a stacking direction, disposing the first group in the other end of the stacking direction, and interposing the second group by the first group and the third group;

a process of injecting a fixed quantity of an adhesive into the magnet insertion hole in which one end is blocked by the third core sheet not having the magnet insertion hole; and a process of bonding and fixing the permanent magnet by inserting the permanent magnet into the magnet insertion hole into which the adhesive is injected;

a process of heating a pair of rotor core stacks into which the permanent magnet is incorporated to a temperature suitable for shrinkage fit;

a process of inserting a shaft into a shaft insertion hole of the pair of rotor core stacks subjected to thermal expansion and causing magnet exposed surfaces of the pair of rotor core stacks to face each other to perform positioning in an axial direction and in a rotary direction such that the permanent magnet can not be visually recognized from an external appearance in the axial direction; and a cooling process for fitting and fixing the pair of rotor core stacks to the shaft;

wherein the third core sheet not having the magnet insertion hole blocks and seals the magnet insertion hole such that the adhesive does not leak out of the magnet insertion hole;

wherein the third core sheet not having the magnet insertion hole has the same thickness as each of the first and second core sheets having a magnet insertion hole;

wherein the pair of rotor core stacks are positioned in the axial direction at a predetermined gap by a seal case structure formed on facing surfaces of the pair of rotor core stacks, and the pair of rotor core stacks are positioned in the rotary direction by engaging a convex portion formed in a seal case male portion with a concave portion formed in a seal case female portion.

5. The method of claim 4, wherein the each of the first, second and third groups includes a plurality of first, second and third core sheets, respectively.

* * * * *